United States Patent [19]

Duszak et al.

[11] Patent Number: 4,492,781
[45] Date of Patent: Jan. 8, 1985

[54] METHOD AND COMPOSITION FOR MAINTAINING AND REPAIRING ASPHALT-AND RUBBER-CONTAINING SURFACES

[76] Inventors: Francis J. Duszak, Box 297, Landenberg, Pa. 19350; James P. Modrak, 403 Blackstone Rd., Newark, Del. 19713; Dick Deaver, 121 Old Kennett Rd., Kennett Square, Pa. 19348

[21] Appl. No.: 496,148

[22] Filed: May 19, 1983

[51] Int. Cl.$^3$ .............................................. C08L 93/00
[52] U.S. Cl. ......................................... 524/59; 524/5; 524/44; 524/45; 524/69; 524/70; 524/71; 524/77; 524/272; 524/460; 524/492; 524/475; 524/832; 524/925; 524/926
[58] Field of Search .................. 524/59, 77, 69, 70, 524/71, 5, 44, 45, 272, 460, 492, 475, 832, 925, 926; 106/277

[56] References Cited

U.S. PATENT DOCUMENTS

| | | | |
|---|---|---|---|
| 2,478,162 | 3/1947 | Somer | 106/203 |
| 2,593,010 | 4/1952 | Clarvoe | 162/179 |
| 2,978,351 | 4/1961 | Pullar | 524/926 |
| 3,235,522 | 2/1966 | Carr | 524/59 |
| 3,457,136 | 7/1969 | Zaadnoordijk | 524/59 |
| 3,505,260 | 9/1970 | Woodruff | 524/60 |
| 3,556,819 | 1/1971 | Koons | 524/59 |
| 3,615,798 | 10/1971 | Woodruff | 524/59 |
| 3,738,853 | 6/1973 | Kopvillem et al. | 106/274 |
| 3,790,519 | 2/1974 | Wahlborg | 524/59 |
| 3,853,800 | 12/1974 | Haberl | 524/59 |
| 3,891,585 | 6/1975 | McDonald | 524/59 |
| 3,912,669 | 10/1975 | Hendrix | 524/59 |
| 3,956,213 | 5/1976 | Hefele | 524/322 |
| 3,985,694 | 8/1976 | Petrucco | 524/68 |
| 4,069,182 | 1/1978 | McDonald | 524/59 |
| 4,077,928 | 3/1978 | Koons | 524/59 |
| 4,137,204 | 1/1979 | McDonald | 524/926 |
| 4,268,428 | 5/1981 | Green | 524/71 |
| 4,302,370 | 11/1981 | Buse | 524/68 |
| 4,393,155 | 7/1983 | Garrett | 524/69 |
| 4,422,878 | 12/1983 | Fry | 524/70 |

OTHER PUBLICATIONS

Iwai: Chem. Abstracts 73: 89059(d).

Primary Examiner—Herbert S. Cockeram

[57] ABSTRACT

Method and composition for protecting, maintaining and repairing paved surfaces utilizing a workable fiber-containing asphalt and/or latex emulsion in combination with an active amount of a water-soluble polymer material differing in ionic characteristics from the emulsion or emulsifier component thereof.

24 Claims, No Drawings

METHOD AND COMPOSITION FOR MAINTAINING AND REPAIRING ASPHALT-AND RUBBER-CONTAINING SURFACES

This invention relates to a method for improving extrudability, workability and durability of hot and ambient paving and sealing compositions utilizing reinforcing fiber components, particularly polymeric material such as polypropylene fiber in asphalt, asphalt/rubber, rubber, acrylic copolymer or asphalt/acrylic copolymer-based emulsions, to obtain a composition compatible with ordinary spreading and paving techniques and equipment.

In addition, the present invention relates to the corresponding fiber-reinforced emulsion-based compositions.

BACKGROUND

Many miles of existing highways comprise asphalt or comparable material in combination with various aggregates such as gravel, crushed stone, and sand. In addition, numerous additional miles are built each year in which asphalt serves as a major component. The continued widespread use of such material, however, depends substantially upon cost, durability of the surfaces, and the frequency and nature of required preventative maintenance in response to constant weather and vehicular-induced damage.

Generally speaking, when repair or resurfacing is carried out, liquified asphalt or asphalt emulsions are applied in one form or another as filler for road cracks, as a waterproof underlayer between old and proposed new paving surfaces, and as the extenal surfacing material itself. For each purpose, however, the amount and fineness of aggregate, the nature and amount of curing and thickening agent and concentration of fiber and other additives can vary widely.

The oiling of asphalt-based surfaces has long standing use for preventative maintenance purposes. Such treatment, however, has many associated limitations and problems, particularly when accompanied by loss in skid resistance and limited lifetime, and where available manpower and budgets are not sufficient to assure consistent adherence to a regular maintenance schedule. The answer, particularly in the later case, is the utilization of a surface having greater durability and flex, which requires less maintenance. Also very useful and desirable, is a durable paving and sealing composition which is applicable under a wide range of temperature conditions, particularly lower temperatures, and which can be laid down and cured within a reasonably short period of time.

Such characteristics are very important when the treatment requires a slurry seal. Here substantial aggregate is utilized in combination with an emulsion and applied onto the damaged surface by using dry box or similar art-recognized applicator devices. Such coating is customarily applied to a depth of about ¼", and at a concentration of about 10–25 lbs/yd², to form an essentially new surface.

While the above treatment avoids some problems, it is much more expensive than oiling. Moreover, substantial room remains for improvement with respect to durability, lay down characteristics, and curing time. Such is particularly the case when durability is dependent upon retention of hydrophobic properties and resistance to low temperature-induced brittleness.

Chip seal treatment is also frequently used to upgrade damaged surfaces. In such treatment, a relatively thick seal or membrane of hot asphalt is laid down, followed by distribution of aggregate thereon with pressing and rolling to smooth the surface and hold the aggregate firmly in the seal or membrane. Here again, however, there remains a need for improved sealing properties, flexibility, and durability, commensurate with the use of regular paving equipment without unduly lengthening the curing time.

Flex and durability have been substantially improved with respect to paving and sealing compositions by including reinforcing fiber materials, such as fiberglass, asbestos, and particularly synthetic polymeric staple fiber, such as polyolefins, in paving compositions.

A preferred synthetic fiber material for such purposes, is found to be polypropylene staple fiber, because of a high degree of compatibility with asphalt-, asphalt-/rubber-, and asphalt/acrylic copolymer-based emulsion components. Such material is conveniently used in amounts of 0.25 to about 10 weight percent reinforcing fiber by weight of base component or emulsion solids, and preferably about 0.25–6.0 weight percent, depending upon intended use.

Addition of synthetic hydrophobic fiber material such as polypropylene also causes some serious problems, however, since it adversely affects pumpability and workability characteristics of the composition, causing fiber clumping during conventional smoothing operations. Moreover, such fiber-reinforced compositions require at least a 10° higher temperature than the usual 130°–145° C. application range, to obtain a workable lay down viscosity. Such heating is undesirable, not only because of higher energy costs, but because of possible temperature-induced degradation of the fibers, and because of the narrowed "temperature window" through which lay down can be successfully carried out under exposed conditions.

Associated with the presence of rubber components such as latex, is the problem of reasonable curing time, and a need for adequate storage life to meet planned or unexpected delay between preparation and lay down of paving or sealing compositions. Such goals are seemingly incompatible, particularly with respect to fiber-containing asphalt/rubber and asphalt/acrylic copolymer-containing compositions for crack seal and slurry seal purposes.

It is an object of the present invention to optimize seemingly inconsistent paving composition properties, particularly with respect to fiber-reinforced compositions.

It is a further object of the present invention to improve control over workability, cure time and durability of paving and sealing compositions containing reinforcing fiber material.

It is a still further object of the present invention to improve resistance to fiber clumping and to increase the internal adhesion of asphalt-, asphalt/rubber-, rubber-, acrylic copolymer-, and asphalt/acrylic copolymer-containing compositions to permit full and effective use of reinforcing fiber material, particularly polymeric polyolefin fibers such as polypropylene fiber.

It is an additional object of the present invention to develop a method for improving workability, cure time and durability of paving and sealing compositions containing polypropylene fiber material.

THE INVENTION

These and other objects are achieved in the present invention for obtaining improved control over workability, cure time, and durability of fiber-reinforced paving and sealing compositions having an emulsion base component of one or more of asphalt-, asphalt/rubber-, rubber-, acrylic copolymer-, or asphalt/acrylic copolymer with an emulsifying agent and water, by adding to said composition an active amount of a water-soluble polymer material compatible with the corresponding emulsion or emulsifying agent. Particularly preferred but not exclusive for purposes of the present invention, are paving and sealing compositions in which the water-soluble polymer is ionically different from and compatible with the corresponding emulsion component as defined below, such as (a) cationic, or (b) anionic water-soluble polymer respectively in combination with (a) anionic and/or nonionic, or (b) cationic and/or nonionic emulsifying agent.

A spreadable fiber-reinforced composition suitable for purposes of the present invention generally comprises, in combination:

(A) an emulsion of
  (a) a base component of one or more materials of an asphalt, asphalt/rubber, rubber, acrylic copolymer, and asphalt/acrylic copolymer having a ratio by base weight of asphalt/rubber/acrylic copolymer of about 100-10/0-90/0-70,
  (b) an active amount of emulsifying agent, and
  (c) water;
(B) an effective amount of water-soluble polymer material compatible with the emulsifying agent;
(C) of 0.25 to about 10.0 weight percent reinforcing fiber component by weight of base component:
(D) about 0-1000 weight percent aggregate by weight of base component;
(E) about 0-5 weight percent of curing and thickening agent by weight of base component; and
(F) about 0-10 weight percent rosin ester material by weight of base component.

The base component as above defined, is preferably utilized at a concentration of about 50-70 weight percent based on emulsion weight, and a preferred ratio-by-weight of asphalt-to-rubber and asphalt-to-acrylic copolymer is about 100-70 to 0-30 parts by weight.

For purpose of the present invention, asphalt material as base component usefully includes bituminous substances generally defined as natural- or petroleum-refiner asphalts, asphaltites, pyrogenous distillates, bottom stock, as well as other pyrogenous residues such as pyrogenous asphalts, petroleum pitch, coal tar pitch and mixtures thereof. Such material is conveniently characterized by a penetration value of from 0-300 or higher (ASTM D-5-51), and preferably about 40-300, with a softening point in the range of about 90°-250° F. (ASTM D-36-26), and preferably between 100°-150° F.

Suitable base component materials are further exemplified, for instance, in Column 3 of U.S. Pat. No. 2,478,162 of Sommers and in Column 2 of U.S. Pat. No. 3,738,853 of Kopvillem et al.

Also included as base material within the present invention are latex copolymers of styrene and butyl acrylate which are obtainable commercially, for instance, as Rohm & Haas EL 805* alone or combined with hydrogenated rosin esters such as FORAL ®85. Also commercially available and of interest for purposes of the above invention, are cured latex materials such as PolySar ®298, which are conveniently combined with about 99-70 weight percent asphalt material to form the base component. Of further interest for purposes of the present invention, are nonlatex-type materials such as acrylic copolymers, preferably in combination with comparable amounts of asphalt and/or rubber material with a reinforcing amount of fiber material, inclusive of crystalline polypropylene.

* Trademark of Rohm and Hass Corporation.

Acrylic copolymer material as described above is further exemplified, for purposes of the present invention, as a 90-75 to 10-25 ratio by weight of ethylene/acrylic acid copolymers. Dow PE490 ethylene/acrylic acid copolymer is another suitable commercially available base component of this type.

Acrylic copolymers, as above defined, are usefully employed in combination with asphalt, polypropylene fiber, water-soluble polymer, fines, and aggregate as hereafter set out, to obtain a tough but somewhat less flexible surface than a corresponding fiber-reinforced rubber/asphalt base material. Both, however, are found satisfactory for purposes of the present invention when utilized within the required parameters.

As above noted, an emulsifying agent for purposes of the present invention can be of the cationic, nonionic or anionic type, or various combinations thereof, and is usefully employed in an active amount varying from about 0.05-5.0 weight percent and preferably about 0.05-0.5 weight percent by weight of base component.

A particularly useful, although not exclusive, class of cationic emulsifying agents includes salts of organic bases and salts of heterocyclic nitrogen bases. Of the former, the cation portion usefully contains at least one basic nitrogen atom and the cation portion has a long chain aliphatic substituent of about 12-24 carbon atoms. Suitable compounds of this type include, for instance, n-dodecyltrimethylammonium chloride, n-dodecyltriethylammonium hydroxide, n-octadecyltri-n-butylammonium nitrate, n-eicosyltrimethylammonium chloride, n-tetracosyltrimethyol-ammonium acetate, and n-octadecylpropyldimethylammonium salicylate.

Nonionic emulsifying agents of a type suitable for use in the present invention include, for instance, compounds within the general formula:

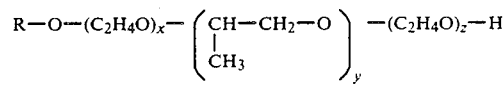

where R is defined as a hydrogen, aryl, or alkylaryl radical; and x, y and z are defined as integers, such that (1) when x is zero, y is also zero, z is 6–11, and (2) when x and y are greater than zero, the sum of x and z is within the range of 20–40, and y is 40–60; also compounds of the formula

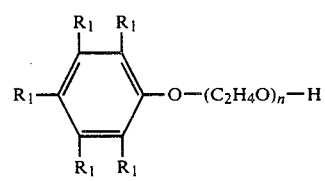

where $R_1$ is individually defined as hydrogen or alkyl groups having 1 to 25 carbon atoms, and n is an integer of 20–60; or a compound of the formula

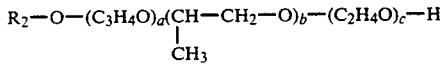

where a and c are defined as integers greater than zero whose sum is 50-350, b is an integer within 40-60, and $R_2$ is defined as a hydrogen or

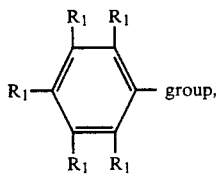 group, where $R_1$ is defined as above.

Suitable anionic emulsifying agents include, for instance, sulfonates, particularly alkyl and aryl sulfonates such as p-dodecylbenzene sodium sulfate, n- or iso-p-octylphenoxypoly (ethyleneoxy) ethanol, sodium sulfonates, sodium isopropylnaphthalene sulfonate, sodium tetrahydronaphthalene sulfonate and methylnaphthalene sodium sulfonate (Petro Ag); and sulfates such as sodium cetyl sulfate (n-hexadecylsodiumsulfate), ammonium lauryl sulfate, sodium tridecyl sulfate; and the phosphates: alkylpolyphosphates, complex amidophospho salts, as well as esters and others such as sodium diamyl sulfosuccinate and disodium-N-octadecyl sulfosuccinate.

Additional emulsifying agents are exemplified, for instance, in Columns 3-5 of U.S. Pat. No. 3,505,260 of Woodruff.

The emulsion vehicle used for purposes of the present invention essentially consists of water, but can include soluble additives (organic and inorganic) known to the art to enhance curing, flexibility, stability, or other specifically-desired properties. Normally up to about 10 to 15 weight percent water, based on base component of the emulsion is found sufficient, while smaller amounts (from 0.10-10.0 weight percent*) are preferred for crack seal and chip seal purposes.

* Based on 55-70% by weight solids.

(B) The utilization of an active amount of a water-soluble polymer material which is compatible with the emulsifying agent, is found particularly useful for improving workability (i.e., pumping and smoothing characteristics and resistance to fiber clumping) of fiber-reinforced compositions. Such is particularly the case where fines and aggregate (stone/sand or sand alone) are present in the composition, and curing time must be carefully controlled.

While the active concentration of the water-soluble polymer material can usefully range up to about 10 weight percent for purposes of the present invention, it has been found that a concentration range of about 0.10-1.5 weight percent by weight of base component is preferred.

In addition, compositions containing the preferred concentration range are more easily cured throughout as evidenced by the retention of some degree of surface permeability for a slightly longer period to permit the escape of interior water to the surface after lay down. Nonionic water-soluble polymer materials are somewhat more effective in this regard, than corresponding water-soluble cationic or anionic polymer materials. This, however, does not preclude the use of a broader active concentration range as above defined.

Form-wise, the water-soluble polymer material can be separately added to the composition either as a dry solid or as an aqueous solution, the choice depending upon the intended use and lay down schedule of the resulting fiber-reinforced composition. For present purposes, however, it is generally found that viscosity (and curing time) are directly correlated to speed of hydration as well as degree of interaction between the water-soluble polymer and emulsifier of different or opposite charge within the emulsion. For example, it is preferred, when soluble polymer is added as a dry solid and early lay down of the composition is expected, to employ an anionic water-soluble polymer with a cationic emulsion (emulsifier).

For purposes of the present invention, compatible anionic-type water-soluble polymer materials can include, for example, a carboxymethyl cellulose, such as the sodium or calcium salt, carboxymethyl hydroxyethyl cellulose, and hydroxypropyl hydroxyethyl cellulose. Acrylic copolymer such as RETEN ® polymer, including RETEN 421, 423, 425, and also relatively, high molecular weight synthetic polymer such as HERCOFLOC ® flocculant polymers, inclusive of the 800, 1000 and 1100 series, are commercially available. In each case, however, the element of compatibility with the emulsifying agent should be observed.

Suitable corresponding compatible cationic-type watersoluble polymer material includes additional RETEN polymers such as RETEN 210, 220, or 300 as well as xanthan gums such as BIOZAN TM * gum.

* Trademark of HTL Biospecialties Ltd., Reading, Great Britain.

Also found useful are specific combinations of base component and Portland cement with NATROSOL ® nonionic cellulose material inclusive of NATROSOL 180 and 250 as well as commercially available acrylic copolymers such as RETEN 420.

(C) Reinforcing fiber components suitable for purposes of the present invention are preferably, although not exclusively, crystalline homopolymer or copolymers of propylene or ethylene. Such usefully include polypropylene having a viscosity average molecular weight of about 140,000-280,000 or higher, with a fiber length of about 0.1 mm-20 mm, and a diameter of about 0.1-5.0 mils or higher. Suitable commercially obtainable polymeric fibers are available, for instance, as Hercules FP 3010 and 4010.

The amount of reinforcing fiber component can vary widely, depending upon intended use. As noted above, however, an active concentration up to about 10.0 weight percent by weight of base component is found useful. In particular, the active concentration range includes about 0.25-10.0 weight percent, and preferably about 0.25-0.75 by weight of base component for slurry seal while 0.25-6.0 weight percent is preferred for use as a crack sealant, and about 0.25-1.5 weight percent generally suffices in a chip sealant, assuming that substantial pumping and/or spreading of the composition will be required to assure adequate application onto and into the surface being treated. In each case, it is assumed that curing time must be of reasonably limited duration* after lay down. Here again, however, compatibility of the water-soluble polymer with the emulsifying agent is important to permit full and effective fiber utilization with adequate curing time.

* Within 1-4 hours.

(D) Aggregate material suitable for purpose of the present invention can usefully range from about 0–1000 weight percent by weight of base component, the amount again depending upon the intended use of the fiber-reinforced composition.

In the case of crack sealant compositions, for instance, an aggregate range of about 0–10 and preferably up to 7.5 weight percent of fine aggregate such as sand, by weight of base component (along with other fines), is found sufficient. This component serves as supplemental thickening agent as well as promoting durability of the resulting surface.

Where the composition is utilized as slurry seal, however, it is preferred that much higher concentration range (500–1000 weight percent) of medium-to-heavy aggregate be utilized, depending on the temperature and method of application desired.

Chip seal usage, on the other hand, can usefully vary from about 50–1000 weight percent, and is preferably used at a concentration of about 100 weight percent of mixed stone, all or a substantial amount of which is generally added separately to form the composition "in situ".

The degree of difficulty in curing such materials generally depends upon the choice of base components, the thickness and viscosity of the composition and the techniques used to apply them to a surface.

Suitable aggregate material includes, for instance, clean dry sieved material ranging from about #4 to #200 sieve size blended to conform to ISSA type II gradations.

(E) Control over viscosity and curing time is effected by adding fines as curing and thickening agents such as one or more of dicalite clay, Portland cement, lime and alum. These, in concentrations of about 0–5 weight percent, and particularly 0.5–2.0 weight percent, are found helpful in the presence of substantial amounts of the above-defined base components. In general, the presence and choice of curing and thickening agents in conjunction with such base materials depends substantially upon the amount of base components used, and the intended functional purpose of the surface. Where, for instance, sealing properties require a high concentration of rubber in the asphalt/rubber base component, it is sometimes found convenient to employ a curing agent such as alum, Portland cement, or combination of the two. Where, on the other hand, 85% or more of the base component is asphalt, then Portland cement alone is generally found satisfactory. In the former situation, however, the hiatus between addition of curing agent and lay down of the composition should be minimized. Here again, the choice of base component(s), the amount of fiber and the compatibility of the water-soluble polymer material must be correlated in order to obtain acceptable fiber-reinforced compositions.

(F) While used primarily with hot asphalt or asphalt mix, it is also found useful, as desired, to include up to about 10 weight percent rosin ester material and preferably up to 5 weight percent by weight of base component or less in cured compositions of the present invention. Such ester additive is inclusive of a mixture comprising straight chain unsaturated fatty acids having up to about 30 weight percent rosin to minimize a characteristic loss of tensile strength and brittleness associated with the fiber reinforced composition under zero or sub-zero temperature conditions.

The above-modified straight chain unsaturated fatty acids usefully comprise mixtures of about 70–100% by weight mono- and di-unsaturated fatty acids, the fatty acid component generally consisting of about 40–50% di-unsaturated acids. Such material is obtainable, for instance, by distillation of Tall Oil* as a by-product from sulfite pulping processes. The above rosin ester material is found to be especially useful when employed as an additive for asphalt or asphalt/rubber compositions in a concentration range of about 0–2.5 weight percent calculated by weight of base component for slurry seal and chip seal purposes and up 0–5 weight percent in crack sealant compositions. The component materials are obtainable commercially (**) from Hercules Incorporated.

* Reference Hackh's Chemical Dictionary, 4th Ed., pg. 660 and Condensed Chemical Dictionary, 10th Ed., pg. 992.
** PAMAK ® fatty acids and FORAL ®85 rosin and rosin esters.

The present invention is further demonstrated, although not limited to, the following Example and Tables:

EXAMPLE 1

Five thousand grams paving grade petroleum refiner asphalt is heated with continuous admixing in a heating kettle until fully melted and temperature stabilized at about 185° F. The material is then emulsified in the usual manner using a stearyl amine acetate as a cationic emulsifying agent with about 10 grams water/100 grams base component. The resulting material (*) is sampled and admixed with additional components as needed in the manner described to obtain a 100 gram base with desired combinations of ingredients. The resulting compositions, labeled as T-1 through T-23, are individually troweled onto a roofing felt using the same trowel technique (**), stored in an oven maintained at about 80° F. and periodically observed to evaluate both spreadability and set time. The results are reported in Tables 1, 2 and 3 below.

* CSS - West Bank Oil; Cationic slow set emulsions meeting ASTM D2397 specification. SF viscosity range of 20–100S; Penetration of 100–250 (40–90 for CSS-lh). E-1805-Windsor Services of Reading, PA - Same characteristics as CSS emulsions.
** 5 passes at ¼" thickness.

TABLE 1

| Sample | T-1 | T-2 | T-3 | T-4 | T-5 | T-6 | T-7 | T-8 | T-9 |
|---|---|---|---|---|---|---|---|---|---|
| E-1805 (CSS) Emulsion*[1] (Cationic) | 100 | 100 | 100 | 100 | 99 | 100 | 100 | 90 | 90 |
| Rohm & Haas EL 805/*[2] FORAL 85 | — | — | — | — | 1 | — | — | 10 | 10 |
| Dow 490*[3] | — | — | — | — | — | — | — | — | — |
| Portland Cement | — | — | 2 | 2 | 1 | 1 | 1 | 1 | 1 |
| NATROSOL 250*[4] (Anionic) | 0.4% | 0.4% | — | — | — | — | — | — | — |
| RETEN (Cationic) | — | — | — | 1 | — | 0.5% | — | — | — |
| CMC (Anionic) | — | — | 0.5% | — | 0.25% | — | — | 0.25% | — |
| FP 3010 Fibers | — | 4% | — | — | — | — | — | — | — |
| FP 4010 Fibers | — | — | 3 | 3 | 3 | 3 | 3 | 3 | 3 |
| Spreadability | E | G | VG | F | E | P | P | E | F |

TABLE 1-continued

| Sample | T-1 | T-2 | T-3 | T-4 | T-5 | T-6 | T-7 | T-8 | T-9 |
|---|---|---|---|---|---|---|---|---|---|
| Set Time | No | Yes 20 Hrs | 30 Min | 1 Hr | 4 Hrs | Wet & Loose 2 Hrs | No | 4 Hrs | 20 Min |

E = Excellent;
VG = Very Good;
G = Good;
F = Fair;
P = Poor;
NT = Not Tested
*1. Cationic asphalt emulsion ASTM D2397 spec.; SF viscosity 20-100s; Penetration 100-250.
*2. Latex copolymer of styrene and butyl acrylate with rosin esters.
*3. Ethylene/Acrylic acid copolymer.
*4. Hydroxyethyl cellulose-based material.

TABLE 2

| Sample | T-10 | T-11 | T-12 | T-13 | T-14 | T-15 | T-16 | T-17 |
|---|---|---|---|---|---|---|---|---|
| E-1805 (CSS) Emulsion (Cationic) | 100 | 100 | 99 | 99 | 230* | 230* | 70 | 75 |
| Rohm & Haas EL 805/ FORAL 85 | — | — | 1 | 1 | — | — | — | — |
| Dow 490 | — | — | — | — | — | — | 30 | 25 |
| Portland Cement | 1 | 1 | 1 | 1 | — | — | 1 | 1 |
| NATROSOL 250 (Anionic) | — | — | — | — | — | 0.25% | — | 0.5% |
| RETEN (Cationic)*5 | 0.5 | — | — | — | — | — | — | — |
| CMC (Anionic)*6 | — | 0.5 | 0.25 | 0.50 | — | — | — | — |
| FP 3010 Fibers*7 | — | — | — | — | 7% | 7% | — | — |
| FP 4010 Fibers*8 | — | — | 3 | 3 | — | — | 3 | 3 |
| Spreadability | P Loose, Wet | G Creamy Smooth | E | G Dry | P | F | P | E |
| Set Time | 2 Hrs | 1 Hr | 4 Hrs | Too Much CMC | NT | NT | (None) Needs Thickener | NT |

E = Excellent;
G = Good;
F = Fair;
P = Poor;
NT = Not Tested
*5. Acrylic copolymer.
*6. Carboxymethyl cellulose.
*7. Polypropylene fiber 3 denier 10 mm length.
*8. Polypropylene fiber 15 denier 10 mm length.

TABLE 3

| Sample | T-18 | T-19 | T-20 | T-21 | T-22 | T-23 |
|---|---|---|---|---|---|---|
| E-1805 (CSS) Emulsion (Cationic) | 99 | 75 | 18 | 18 | 18 | 18 |
| Rohm & Haas EL 805/ FORAL 85 | 1 | — | — | — | — | — |
| Dow 490 | — | 25 | — | — | — | — |
| Portland Cement | 1 | 1 | 1 | 1 | 1 | 1 |
| NATROSOL 250 (Anionic) | 1.0% | 0.5% | 0.25% | 0.50% | 1.0% | 2.0% |
| Stone Aggregate | — | — | 100 | 100 | 100 | 100 |
| FP 4010 Fibers | 3.0% | 3.0% | 0.5% | 0.5% | 0.5% | 0.5% |
| Spreadability | E | E | Creamy But Too Tight | Creamy But Too Tight | Creamy But Too Tight | Creamy But Too Tight |
| Set Time | 90 Min | NT | 30 Min | 25 Min | 12 Min | 5 Min |
| Water Sensitivity | — | — | G | P | P | P |

E = Excellent;
G = Good;
P = Poor

What we claim and desire to protect by Letters Patent is:

1. A spreadable fiber reinforced composition comprising, in combination
    (A) an emulsion comprising
        (a) a base component of one or more materials of a member selected from the group consisting of an asphalt, asphalt/rubber, rubber, acrylic copolymer, and asphalt/acrylic copolymer having a ratio by base weight of asphalt/rubber/acrylic copolymer of about 100-10/0-90/0-70,
        (b) an effective amount of emulsifying agent, and
        (c) water;
    (B) an active effective amount of water-soluble polymer material compatible with the emulsifying agent;
    (C) 0.25 to about 10.0 weight percent reinforcing fiber component by weight of base component;

(D) about 0–1000 weight percent aggregate by weight of base component;

(E) about 0–5 weight percent of curing and thickening agent by weight of base component; and (F) about 0–10 weight percent rosin ester material by weight of base component.

2. The composition of claim 1 wherein the water-soluble polymer material is at least one member selected from the group consisting of a carboxymethyl cellulose, carboxymethyl hydroxyethyl cellulose, hydroxypropyl hydroxyethyl cellulose and acrylic copolymer.

3. The composition of claim 1 wherein the water-soluble polymer material is added as a dry solid or as a solution, in an active amount up to about 10 weight percent polymer by weight of base component.

4. The composition of claim 3 wherein the water-soluble polymer is present in a concentration range of about 0.10–1.5 weight percent by weight of base component.

5. The composition of claim 1 wherein the reinforcing fiber material is a crystalline homopolymer or copolymer of propylene or ethylene at a concentration of about 0.25–6.0 weight percent.

6. The composition of claim 3 wherein the water-soluble polymer material is of differing ionic charge from said emulsifying agent.

7. A composition of claim 6 wherein anionic water-soluble polymer material is utilized with an asphalt or asphalt/rubber emulsion having a cationic emulsifying agent.

8. A composition of claim 6 wherein cationic water-soluble polymer material is utilized with an asphalt or asphalt/rubber emulsion having an anionic emulsifying agent.

9. The composition of claim 1 wherein the curing and thickening agent is selected from the group consisting of at least one of Portland cement, diatomaceous silica, lime and alum.

10. The composition of claim 3 containing a base component of asphalt or asphalt/rubber combination having a ratio asphalt-to-rubber of about 100–70 to 0–30 parts by weight in combination with
(a) 0.10 to about 10 weight percent water;
(b) 0–10.0 weight percent aggregate;
(c) 0.5–2.0 weight percent fines as curing and thickening agent; and
(d) 0–5 weight percent rosin ester.

11. The composition of claim 3 containing a base component asphalt-to-rubber having a ratio of 100–70-:0–30 parts by weight in combination with
(a) 10 to about 15 weight percent water;
(b) 500–1000 weight percent aggregate;
(c) 0.5–2.0 weight percent fines as curing and thickening agent; and
(d) 0–5.0 weight percent rosin ester.

12. The composition of claim 3 containing a base component of asphalt or asphalt/rubber combination having a ratio of asphalt-to-rubber of 100 to 0–30 parts by weight in combination with about (a) 0.10 weight percent water;
(b) 500–1000 weight percent aggregate; and
(c) 0–2.5 weight percent rosin ester.

13. A composition of claim 10 wherein the base component comprises an asphalt material, the aggregate is sand, the curing and thickening agent is Portland cement, and the water-soluble polymer material is carboxymethyl cellulose.

14. A composition of claim 10 wherein the base component comprises a styrene/butadiene copolymer material, the aggregate is sand, the curing agent is Portland cement, and the water-soluble polymer material is carboxymethyl cellulose.

15. A composition of claim 10 wherein the base component comprises an acrylic acid/ethylene copolymer, the aggregate is sand, the curing agent is Portland cement, and the water-soluble polymer material is carboxymethyl cellulose.

16. A method for obtaining improved control over workability, cure time, and durability of fiber-reinforced paving and sealing compositions having an emulsion base component of one or more of asphalt, asphalt/rubber, rubber, acrylic copolymer, or asphalt/acrylic copolymer, with an emulsifying agent and water;
comprising adding to said composition an effective amount of a water-soluble polymer material compatible with the corresponding emulsion or emulsifying agent.

17. The method of claim 16 wherein the water-soluble polymer is anionic in nature and the emulsion and its emulsifier is cationic or nonionic in nature.

18. The method of claim 16 wherein water-soluble polymer is cationic in nature and the asphalt emulsion and its emulsifier is anionic or nonionic in nature.

19. The method of claim 16 wherein water-soluble polymer material is added to the emulsion as a dry powder to obtain a concentration of about 0.10–1.5 weight percent of base component.

20. The method of claim 16 wherein water-soluble polymer material is added to the emulsion as an aqueous solution to obtain a concentration of about 0.10–1.5 weight percent of base component.

21. The method of claim 17 wherein the water-soluble polymer material is a member selected from the group consisting of a carboxymethyl cellulose, carboxymethyl hydroxyethyl cellulose, hydroxypropyl hydroxyethyl cellulose, and acrylic copolymer.

22. The method of claim 18 wherein the water-soluble polymer material is carboxymethyl cellulose.

23. The method of claim 16 wherein the reinforcing fiber component is a crystalline homopolymer or copolymer of propylene or ethylene at a concentration of about 0.25–6.0 weight percent.

24. The method of claim 16 wherein at least one curing and thickening agent selected from the group consisting of Portland cement, diatomaceous silica, and alum is employed in active amount with an asphalt- or asphalt/rubber-based emulsion.

* * * * *

UNITED STATES PATENT AND TRADEMARK OFFICE
CERTIFICATE OF CORRECTION

PATENT NO. : 4,492,781

DATED : January 8, 1985

INVENTOR(S) : Francis J. Duszak, James P. Modrak & Dick Deaver

It is certified that error appears in the above-identified patent and that said Letters Patent are hereby corrected as shown below:

On the title page, add Item [73] Assignee:

-- Assignee: Hercules Incorporated -- .

Claim 1, Column 10, line 64;

"active" should be omitted.

Signed and Sealed this

Eleventh Day of June 1985

[SEAL]

Attest:

DONALD J. QUIGG

Attesting Officer

Acting Commissioner of Patents and Trademarks